United States Patent [19]
Molz

[11] 3,755,862
[45] Sept. 4, 1973

[54] MACHINE FOR SIMULTANEOUS BIAXIAL STRETCHING OF A WEB OF THERMOPLASTIC SHEETING

[75] Inventor: Udo Molz, Muhler, Germany

[73] Assignee: Erwin Kampf Maschinenfabrik, Wiehl, Germany

[22] Filed: Nov. 26, 1971

[21] Appl. No.: 202,383

[30] Foreign Application Priority Data
Dec. 11, 1970 Germany............ P 20 60 965.8

[52] U.S. Cl. .......................... 26/57 R, 198/213
[51] Int. Cl. ............................... D06c 3/00
[58] Field of Search.............. 26/57 R; 198/213; 287/86; 64/15 C

[56] References Cited
UNITED STATES PATENTS

| | | | |
|---|---|---|---|
| 3,148,765 | 9/1964 | Weiss et al. | 198/213 |
| 3,178,010 | 4/1965 | Van Keuren et al. | 198/213 |
| 3,178,012 | 4/1965 | Weiss et al. | 198/213 |
| 3,445,887 | 5/1969 | Tsien | 26/57 R UX |
| 3,590,985 | 7/1971 | Hirsch | 198/213 |

FOREIGN PATENTS OR APPLICATIONS

| | | | |
|---|---|---|---|
| 23,367 | 7/1962 | Germany | 26/57 R |
| C11,415 | 12/1956 | Germany | 198/213 |

Primary Examiner—Robert R. Mackey
Attorney—Harry W. F. Glemser et al.

[57] ABSTRACT

A web stretching machine has serially arranged gripper driving screws extending at angles relative to each other. Helical coil springs are secured to adjacent ends of adjacent screws to define flexible gripper advancing helixes for the continuous driving of grippers from screw to screw.

3 Claims, 2 Drawing Figures

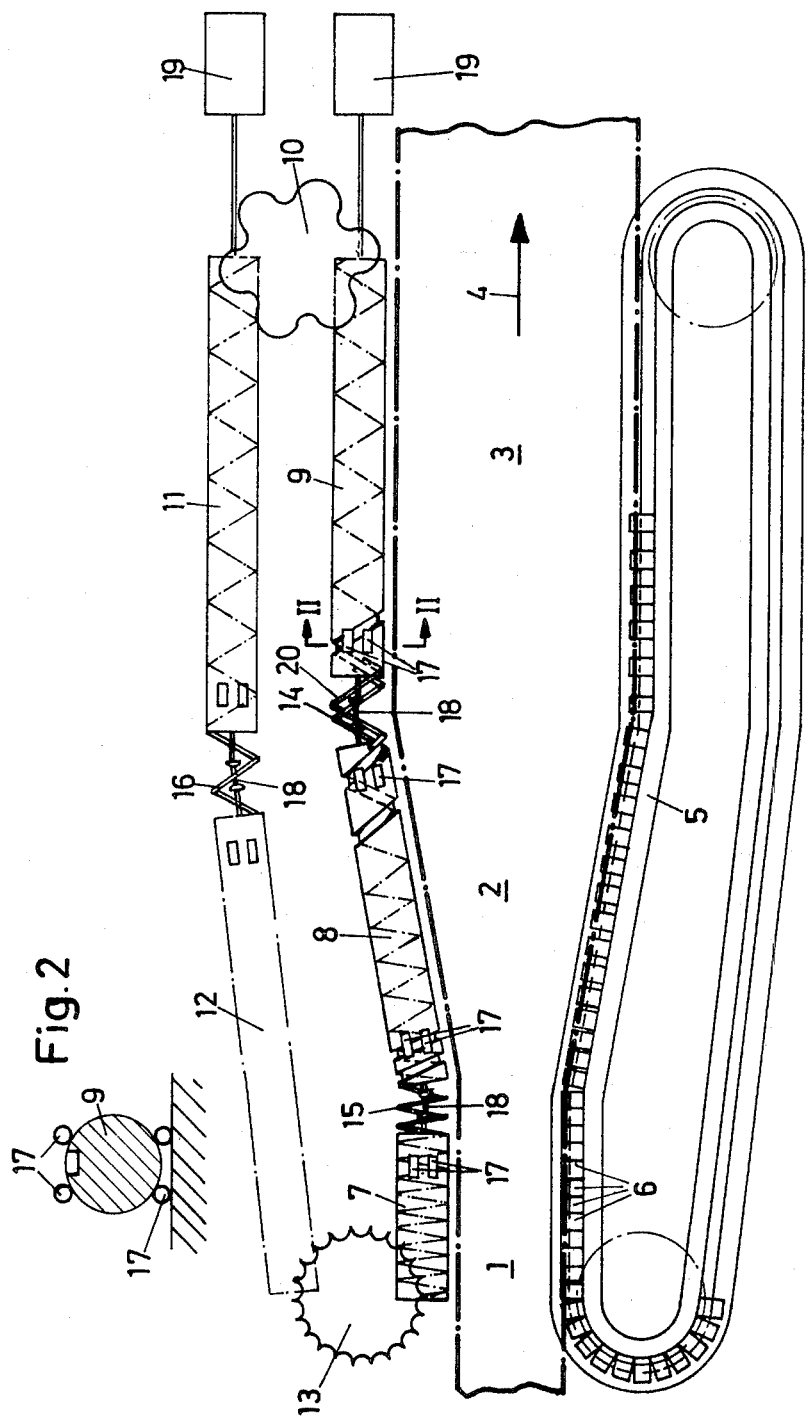

MACHINE FOR SIMULTANEOUS BIAXIAL STRETCHING OF A WEB OF THERMOPLASTIC SHEETING

BACKGROUND OF THE INVENTION

The present invention relates to a machine for simultaneous biaxial stretching of a web of thermoplastic sheeting comprising a preliminary treatment zone, a stretching zone and a zone for after-treatment of the sheet web with gripping means arranged on guide rails for endless recirculation and driven by variable and constant pitch transport screws, with any two adjacent transport screws being arranged and connected so that their axes intersect at an angle.

A machine of this type has been described in Austrian Pat. 243,498 as well as in German Democratic Republic Pat. 23,367. The transport screws provided with helical or screw guides ensure a positive drive of the gripping means so that perfect carrying along of the sheet web is safeguarded. But still there are difficulties in the transition zone between those transport screws whose axes intersect each other at an angle, i.e. particularly at the starting and the terminal end of the stretching zone in which the transport screws are disposed with their axes inclined relatively to the direction of sheet web travel.

Attempts have been made to eliminate such positive carrying along of the grippers and to move them by frictional contact respectively within the range of the stretching zone by the sheet web as such, for instance see the German Inspection Document 1,504,242 laid open on July 3, 1969. Experiences indicate, however, that positive transportation of grippers throughout the entire length of the machine is imperative for obtaining perfect operational results. There is no other way to obtain a sheet web with uniform properties.

The U.S. Pat. No. 3,445,887 relates to a machine of the type defined in the opening paragraph and seeks to provide a uniform transition of gripping means between transport screws adjoining one another at angles. The carrier dogs of said gripping means are uniformly transferred from one transport screw to the next by providing one extremity of the transport screw with a ball end and the other extremity with a ball cup so that the transport screws adjoin each other in a manner similar to a ball-and-socket joint. The screw guide grooves are carried up to the start of said ball-and-socket joints and each screw extends right into the ball end, at its base portions. This ensures that the screw guide grooves of adjoining transport screws substantially contact each other within range of the angle bisectors of the transport screws' angle of intersection. The gripping means carrier dogs engage into the screw guide grooves under a 90° offset relative to the axial plane determined by the angle bisector, however, and it is in this location that the screw guide grooves are no longer flush with each other. Even though a pickup of the respective gripper is ensured with the aid of the base portion of the screw guide grooves which extend into the ball end, the adjustment required to this end is very delicate and shocks and impacts on the grippers cannot be avoided in said transition zone. This solution necessitates very precisely machined screw extremities so that the ball-and-socket guides operate smoothly. Since a screw guide groove of great depth is needed, very comprehensive machining of the transport screws is involved and required. In this prior art arrangement the transport screws are carried by rollers distributed along the length of the screws. The transport screws are coupled by means of cardan shaft couplings.

SUMMARY OF THE INVENTION

The object of the present invention is to provide a continuation of the screw guide at the transition zone between two adjacent transport spindles disposed with angularly intersecting axes.

According to the present invention this object is achieved in that the transport screws are connected by at least one helical spring whose extremities adjoin the guide faces of the transport screws and the principal diameter of which corresponds to the diameter of the transport screws at said guide faces.

The present invention ensures a uniform and safe guiding of the web of plastic material over the entire length of the machine. In the transition zone between adjacent transport screws disposed with angularly intersecting axes the gripping means are uniformly moved by the helical spring so that no shock loads or unexpected stresses are transmitted to the sheet web. Within range of the transport screws the grippers are carried along by the guide faces with the aid of a carrier dog and/or roller. The helical springs engage and advance these carriers and hence pass the gripping means on in conveying sense. The action of the helical spring on the gripping means is identical with the action of the driving area of a screw guide face.

The helical spring provides a continuous extension of the guide face so that positive carrying along of the grippers inside the transition zone is ensured in the absence of any irregularities. On the other hand the helical spring exhibits an elastic yield and deformation so as to adjust itself to the extent required as the transport screws rotate. Whenever the transport screws are aligned or adjusted for a different stretch ratio the helical spring readily follows such variations so that irregularities, if any, in alignment are compensated. The helical spring is also capable of compensating such thermal deformations of the transport screws as are likely to occur during operation of the machine.

A preferred embodiment of the present invention provides for a machine in which the guide face of each transport screw is in the form of a groove with two helical springs in nested arrangement so disposed that they are spaced apart a distance corresponding to the width of the groove and each extremity of the two helical springs is received by and secured in an edge cutout portion of the guide face of a transport screw with their inner edges forming flexible continuations of the sides of the screw groove.

This results in an even better guiding of the grippers in the transition zone because said gripping means are bilaterally supported by the two adjacent helical springs in the same manner as they would be by the faces of the screw guide groove so that the grippers advance only at the predetermined speed.

The use of helical springs according to the present invention permits adjacent transport screws to be substantially spaced apart which is very favorable because it provides for compensation of thermal stresses and length variations. Such stresses are readily compensated by said helical springs. There is adequate space left for a drive coupling between the facing ends of successive transport screws and there is no need whatsoever for special machining or adapting of transport screw ends.

BRIEF DESCRIPTION OF THE DRAWINGS

The invention will now be described by way of a preferred embodiment with reference to the accompanying drawing in which:

FIG. 1 is a schematic view of a machine according to the present invention; and

FIG. 2 is a section on line II—II in FIG. 1.

DESCRIPTION OF A PREFERRED EMBODIMENT

FIG. 1 shows only those portions of the drive assembly of a machine for simultaneous biaxial stretching which are essential to the invention. In this machine the web of thermoplastic sheeting pulled from a roll of material (not shown) passes a preliminary treatment zone 1 which mainly serves to heat the sheet web, a stretching zone 2 and an after-treatment zone 3 which mainly serves for setting the sheet web as stretched. The sheet web is finally coiled on a winding device not shown. The direction of travel of the sheet web through the machine is indicated by an arrow 4. The speed of sheet web travel is comparatively low in the preliminary treatment zone 1, continuously increases in the stretching zone consistent with the extent of longitudinal stretching and reaches a corresponding final value in the after-treatment zone 3. The sheet web is held by grippers on either side which must be advanced in conformity with these speed variations as described above.

The bottom portion of FIG. 1 schematically shows the recirculation track 5 for the gripping means 6, while the top portion of said FIG. 1 represents the transporting facilities for the grippers 6 which are normally carried by a guide rail (not shown) FOR endless recirculation. The grippers 6 are close together in the preliminary treatment zone, become spaced apart in the stretching zone 2 and must be conveyed at great spacing in the after-treatment zone 3. The gripping means are transported by transport screws, namely, one transport screw 7 with minor, but constant pitch in the preliminary treatment zone 1, one progressive-pitch transport screw 8 in the stretching zone 2 and in the after-treatment zone 3 with the aid of a transport screw 9 with constant pitch which is greater than the pitch of the screw 7 in conformity with the longitudinal stretch. At the one end of the recirculation track there is a reversing wheel 10. Return feed of the gripping means 6 is effected by another transport screw 11 with large pitch as well as a transport screw 12 with regressive or diminishing pitch. Finally, the grippers are returned to the starting end of the preliminary treatment zone 1 by means of another reversing wheel 13.

FIG. 1 clearly shows that the various transport screws are disposed with angularly intersecting axes. The entire assembly comprising the transport screws and recirculation tracks is adjustable over the width of the machine to permit the machine to be adapted to various sheet widths on the one hand and to be adjusted for various stretch ratios on the other hand. In consequence, it is necessary to provide special arrangements to ensure a smooth transition of the grippers from one transport screw to the next and particularly a uniform carryover of the grippers in said transition zones.

The transport screws are provided with guide means in the form of helical grooves which are partly shown by dash-and-dot line in schematic representation. Between any two adjacent transport screws there is a helical spring means 14, 15 and 16 whose extremities are received by and secured in an edge cutout at the ends of the grooves of adjacent transport screws. More particularly the helical spring means are disposed in extension of the side guiding faces of the grooves. The helical spring means 14 has a large pitch corresponding to the pitch of the groove at the end of the progressive pitch transport screw 8. In contrast to said helical spring means 14 the helical spring means 15 has a smaller pitch corresponding to the pitch of the groove of the transport screw 7. Helical spring 16 in the return line is likewise of a large pitch.

If using only one helical spring at 14, 15 and 16 between two adjacent screws, the respective helical spring is connected to the driving face of the groove so that a transporting force is continuously applied to the respective gripping means 6.

In a modified embodiment of the invention, however, the spring means comprise two helical springs 14 and 20 disposed between any two adjacent transport screws 8 and 9 in nested arrangement such that their coils are spaced a distance from each other that is equal to the width of the groove. Helical spring 14 is disposed in extension of the driving face of the groove and helical spring 20 in extension of the opposite face. This establishes a continuation and extension of the two guide faces of the groove within the transition zone so that the respective gripper is moved along at exactly the predetermined speed in said zone: the gripper cannot move too fast nor too slowly. This is of particular importance where the jumping of grippers must be prevented.

It is deemed particularly desirable to provide the transition following the stretching zone 2 with a double-threaded helical spring since a considerable tensile stress is initially present in the sheet web to be set in the after-treatment zone 3. Of course, it is possible also to provide all other transitions with such double-threaded helical springs if so deemed necessary.

Rotational movement of the transport screws causes an elastic deformation of the helical springs to the required extent in each case so that a uniform shift of the guide faces is ensured at all times. The helical springs ensure a flexibly resilient transition between successive transport screws.

The transport screws are carried by rollers 17 disposed about the circumference of said screws. According to FIG. 2, for instance, there may be four rollers 17 provided which are mounted in the machine frame and distributed around the circumference of the transport screws. Said screws are connected by means of a coupling shaft 18 such as of universal or cardan type. The transport screws can be driven by drive motors 19 which may be in communication with a change speed gear. These motors 19 can be used at the same time for driving the reversing wheels 10 and 13 via connnections not shown.

I claim

1. In a machine for simultaneous biaxial stretching of a web of thermoplastic sheet material and having a preliminary treatment zone, a stretching zone, an after treatment zone, guide rails for guiding grippers through said zones sequentially and return from the end of said after treatment zone to the start of said preliminary treatment zone, adjustably angularly related rigid driving screws, having helical grooves therein, arranged to advance grippers through said zones sequentially, and drive means for rotating said screws and for returning said grippers to said start, the improvement comprising:

adjacent ends of angularly related screws being axially spaced apart and at least one resiliently flexible helical spring freely spanning the space between said ends and secured to said screws, said spring having a surface defining an uninterrupted smooth continuation of the gripper driving surface of the guide grooves of said screws and being of substantially the same diameter.

2. A machine as defined in claim 1 wherein each end of said spring is received and secured in a cut-away portion of the corresponding screw at one side of the guide groove thereof.

3. A machine as defined in claim 2 wherein two of said helical springs are provided between said screws, said springs being spaced apart a distance substantially equal to the width of said guide grooves and respectively defining continuations of the respective sides of said grooves.

* * * * *